(12) United States Patent
Buttry et al.

(10) Patent No.: US 11,594,759 B2
(45) Date of Patent: *Feb. 28, 2023

(54) CALCIUM SALT FOR CALCIUM BATTERIES

(71) Applicant: Arizona Board of Regents on behalf of Arizona State University, Scottsdale, AZ (US)

(72) Inventors: Daniel Buttry, Tempe, AZ (US); Joseph Rheinhardt, Phoenix, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/716,226

(22) Filed: Apr. 8, 2022

(65) Prior Publication Data

US 2022/0367914 A1 Nov. 17, 2022

Related U.S. Application Data

(63) Continuation of application No. 16/694,950, filed on Nov. 25, 2019, now Pat. No. 11,342,589.

(60) Provisional application No. 62/772,868, filed on Nov. 29, 2018.

(51) Int. Cl.
| | |
|---|---|
| *H01M 10/0568* | (2010.01) |
| *H01M 10/0565* | (2010.01) |
| *H01M 10/0569* | (2010.01) |
| *H01M 10/44* | (2006.01) |

(52) U.S. Cl.
CPC ... *H01M 10/0568* (2013.01); *H01M 10/0565* (2013.01); *H01M 10/0569* (2013.01); *H01M 10/44* (2013.01); *H01M 2300/0025* (2013.01); *H01M 2300/0085* (2013.01)

(58) Field of Classification Search
CPC ......... H01M 10/0568; H01M 10/0565; H01M 10/0569; H01M 10/44; H01M 2300/0025; H01M 2300/0085
See application file for complete search history.

(56) References Cited

U.S. PATENT DOCUMENTS

2017/0250438 A1* 8/2017 Barde ................... H01M 4/387

\* cited by examiner

*Primary Examiner* — Victoria H Lynch
(74) *Attorney, Agent, or Firm* — Snell & Wilmer L.L.P.

(57) ABSTRACT

Disclosed is a calcium salt, $Ca(HMDS)_2$, where HMDS is the hexamethyldisilazide anion (also known as bis(trimethylsilyl)amide), enables high current densities and high coulombic efficiency for calcium metal deposition and dissolution. These properties facilitate the use of this salt in batteries based on calcium metal. In addition, the salt is significant for batteries based on metal anodes, which have higher specific energies than batteries based on intercalation anodes, such as $LiC_6$. In particular, a calcium based rechargeable battery includes $Ca(HMDS)_2$ salt and at least one solvent, the solvent suitable for calcium battery cycling. The at least one solvent can be diethyl ether, diisopropylether, methyl t-butyl ether (MTBE), 1,3-dioxane, 1,4-dioxane, tetrahydrofuran (THF), tetrahydropyran, glyme, diglyme, triglyme or tetraglyme, or any mixture thereof.

14 Claims, 10 Drawing Sheets

CALCIUM SALT FOR CALCIUM BATTERIES

CROSS REFERENCE TO RELATED APPLICATIONS

This application is a continuation of U.S. Ser. No. 16/694,950 filed on Nov. 25, 2019, now U.S. Patent Application Publication No. 2020-0176819 entitled "Calcium Salt for Calcium Batteries." U.S. Ser. No. 16/694,950 claims priority to and the benefit of U.S. Provisional Application No. 62/772,868 filed Nov. 29, 2018 and entitled "Calcium Salt for Calcium Batteries". The disclosure of the foregoing applications is incorporated herein by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

STATEMENT OF GOVERNMENT SUPPORT

This invention was made with government support under W911NF-17-1-0466 awarded by the Army Research Office. The government has certain rights in the invention.

TECHNICAL FIELD

The present disclosure relates to electrochemistry of calcium ions, and in particular, to a calcium salt that enables high current densities and high coulombic efficiency for calcium metal deposition and dissolution.

BACKGROUND

Across the globe, scientist are interested in what is coming after lithium batteries. The rechargeable batteries have become the dominant power source in any number of consumer electronics, from phones to cars. It has been suggested that the global lithium ion battery market will hit 100 billion by 2024.

However, that growth comes with several challenges. For example, there are limited sources suitable for large-scale lithium extraction. In addition, lithium extraction results in extreme environmental impacts, such as heavy water consumption. Thus, there is a continued need for replacement of lithium-based batteries.

Calcium has the potential to act as a replacement. For example, it is already used in lead acid batteries, which are often seen in automotive starter motors. Calcium is the fifth most abundant element in the Earth's crust and the third most abundant metal, with equal geographical resource distribution around the globe. Calcium also lacks lithium's troublesome trait of catching fire. The challenge for the adoption of calcium has been finding a workable electrolyte. Within batteries, an electrolyte is a medium that allows the battery to move ions from one place to another. For a battery to work, it needs to transfer ions from its cathode to its anode and back. Electrolytes come in many varieties, including soluble salts, acids, or other bases in liquid, gelled, and dry formats.

SUMMARY

Disclosed herein is a method of providing a battery, comprising: providing an anode; providing a cathode; calcium salt, comprising a $Ca^{2+}$ cation and two hydrocarbon substituted disilazide anions; and at least one solvent, suitable for calcium battery cycling.

In embodiments, the hydrocarbon substituted disilazide anions comprise or consist of a hexamethyldisilazide anion or a derivative thereof. In embodiments, the hydrocarbon substituted disilazide anions comprise or consist of —N(SiMe3)(SiMe2tBu), where tBu refers to a tertiary butyl group, —N(SiMe3)(SiPh2tBu), where Ph refers to a phenyl group, —N(SiMePh2)2, —N(SiMe3)(SiPh3), or —N(SiMe3)(Mes), where Mes refers to a mesityl group, or N(SiMe3)(Dipp), where Dipp refers to 2,6-di-isopropylaniline.

In embodiments, the at least one solvent includes or consists of diethyl ether, diisopropyl ether, methyl t-butyl ether (MTBE), 1,3-dioxane, 1,4-dioxane, tetrahydrofuran (THF), tetrahydropyran, glyme, diglyme, triglyme, tetraglyme, a secondary or tertiary amine or any mixture thereof.

In embodiments, the calcium salt dissociates, in solution with at least one solvent, into $Ca^{2+}$ and $HMDS^-$ ions or derivatives thereof such that a concentration of $Ca^{2+}$ (in all its speciated forms) is greater than or equal to 1.0M. In embodiments, the concentration of $Ca^{2+}$ enables current densities for calcium metal deposition and dissolution>30 $mA/cm^2$ at 25 mV/s. In embodiments, a fraction of THF in the electrolyte that is coordinated in a coordination sphere of the $Ca^{2+}$ is sufficiently high to prevent deleterious reactions with a calcium metal anode. In embodiments, the concentration of free THF is one of: 10 mole %, such as below 10 mole %, including below 9 mole %, below 8 mole %, below 7 mole %, below 6 mole %, below 5 mole %, below 4 mole %, below 3 mole %, below 2 mole %, below 1 mole %, below 0.1 mole %, below 0.01 mole %, for example between 10 mole % and 0.01 mole %, or between 1 mole % and 0.01 mole %, between 1 mole % and 0.1 mole %, between 0.1 mole % and 0.01 mole %, such as 9 mole %, 8 mole %, 7 mole %, 6 mole %, 5 mole %, 4 mole %, 3 mole %, 2 mole %, 1 mole %, 0.5 mole %, 0.1 mole %, 0.05 mole %, or 0.01 mole % of a total amount of solvent in the electrolyte. In embodiments, at least one solvent is THF and the concentration of calcium salt in the THF is between 1 M and 2.47 M.

In embodiments, the calcium salt is dissolved in the solvent at a concentration greater than a mole fraction of 0.065. In embodiments, the calcium salt is provided as a liquid electrolyte, which is dissolved in at least one solvent. In embodiments, the calcium salt is dissolved in a polymer gel electrolyte in at least one solvent, and mixed with a suitable polymer matrix.

In embodiments, the cathode includes a redox active material capable of $Ca^{2+}$ insertion. In embodiments, the redox active material is at least one of: $V_2O_5$, $Mn_2O_4$, or $MnO_2$.

In embodiments, the cathode includes a material used for $Na^+$ insertion. In embodiments, the material used of $Na^+$ insertion is at least one of $NaMnFe_2(PO_4)_3$, $NaVO_3$, or $Na_2FeP_2O_7$.

The foregoing and other features of the disclosure will become more apparent from the following detailed description, which proceeds with references to the accompanying figures.

BRIEF DESCRIPTION OF THE DRAWINGS

With reference to the following description and accompanying drawings:

FIG. 1 also provides the chemical structure of HMDS.

DETAILED DESCRIPTION

Figure 1:
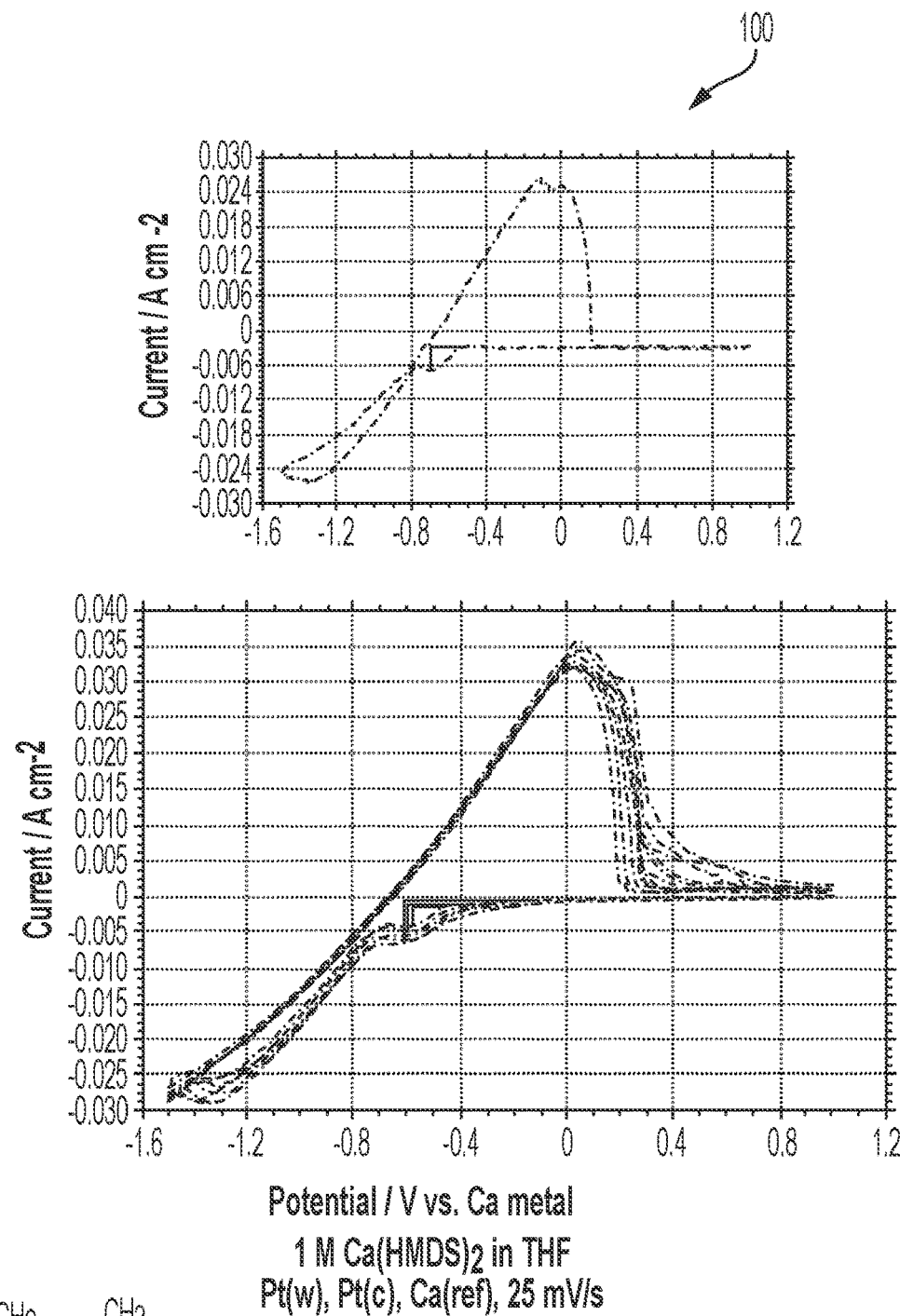
FIG. 1 illustrates both single cycle and multiple cycle data for Ca(HMDS)$_2$ dissolved in THF at a concentration of 1 M, in accordance with various embodiments (Pt(w), Pt(c), Ca(ref), 25 mV/s). Ca(HMDS)$_2$ was synthesized and rigorously dried THF (Na/benzophenone) was used. Hexamethyldisilazide has a pKa reported to be 26, so it will drive CaO(s) formation in the electrolyte, consuming water. Cyclic voltammetry for Ca electrodeposition is shown at (upper) right for a single scan and 15 repetitive scans shown at (lower) right. Electrodeposition appears relatively reversible and very high current densities, >30 mA cm$^{-2}$ at 25 mV s$^{-1}$ were observed.
Figure 1:
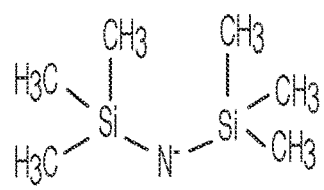

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, conventional techniques and components may not be described in detail herein. Furthermore, the connecting lines shown in various figures contained herein are intended to represent exemplary functional relationships and/or physical couplings between various elements. It should be noted that many alternative or additional functional relationships or physical connections may be present in exemplary systems and/or components thereof.

Unless otherwise explained, all technical and scientific terms used herein have the same meaning as commonly understood by one of ordinary skill in the art to which this disclosure belongs. Although methods and materials similar or equivalent to those described herein can be used in the practice or testing of this disclosure, suitable methods and materials are described below. In addition, the materials, methods, and examples are illustrative only and not intended to be limiting.

The following explanations of terms and methods are provided to better describe the present compounds, compositions and methods, and to guide those of ordinary skill in the art in the practice of the present disclosure. It is also to be understood that the terminology used in the disclosure is for the purpose of describing particular embodiments and examples only and is not intended to be limiting.

As used herein, the singular forms "a," "an," and "the" are intended to include the plural forms as well, unless the context clearly indicates otherwise.

As used herein, the term "and/or" refers to and encompasses any and all possible combinations of one or more of the associated listed items, as well as the lack of combinations when interpreted in the alternative ("or").

As used herein, "one or more" or at least one can mean one, two, three, four, five, six, seven, eight, nine, ten or more, up to any number.

Lithium battery technology is generally well known. The next frontier is multielectron battery systems based on metals such as, for example, Mg$^{2+}$ and Ca$^{2+}$. Over the past several years considerable effort has been spent on Mg$^{2+}$ battery science while little work has been done on calcium batteries. However, it is disclosed herein that calcium batteries are advantageous and attractive for a number of reasons.

For example, on a volumetric basis, calcium is just as attractive as Li (2072 mA hr cm$^{-3}$; and 2062 mA hr cm$^{-3}$, respectively). Part of the issue is that calcium metal is even more reducing than Mg, with a similar reduction potential to Li. This potent reducing power drives electrolyte decomposition, leading to poor reversibility. Attempts to reversibly deposit calcium metal have, for the most part, failed. One recent paper describes how Ca(BH$_4$)$_2$ may be dissolved in tetrahydrofuran (THF), and that this electrolyte allows reasonably reversible deposition and dissolution of calcium metal. However, the paper further indicates that the calcium metal reacts with THF, producing a surface film containing $CaH_2$ (calcium hydride), which thus fouls the surface. The $CaH_2$ surface film thus interferes with achieving high coulombic efficiency, because its formation consumes calcium metal (*Plating and stripping calcium in an organic electrolyte*, by: Wang, Da; Gao, Xiangwen; Chen, Yuhui; et al. NATURE MATERIALS Volume: 17 Issue: 1, Pages: 16-20. Published: January 2018). Thus additional calcium based batteries are needed.

Disclosed herein is a calcium based rechargeable battery. The calcium based rechargeable battery includes a calcium salt that comprises or consists of a $Ca^{2+}$ cation and two hydrocarbon substituted disilazide anions. The calcium based rechargeable battery further incudes at least one solvent, suitable for calcium battery cycling, for example a solvent that can solvate the $Ca^2$ cation and the two hydrocarbon substituted disilazide anions.

In embodiments, the calcium salt is a $Ca^{2+}$ cation and two hydrocarbon substituted disilazide anions, for example a methyl substituted disilazide anion, such as a hexamethyldisilazide anion (also known as bis(trimethylsilyl)amide) or a derivative thereof, such as, such as $^-N(SiMe_3)(SiMe_2{}^tBu)$, where $^tBu$ refers to a tertiary butyl group, $^-N(SiMe_3)(SiPh_2{}^tBu)$, where Ph refers to a phenyl group, $^-N(SiMePh_2)_2$, $^-N(SiMe_3)(SiPh_3)$, or $^-N(SiMe_3)(Mes)$, where Mes refers to a mesityl group or $N(SiMe_3)(Dipp)$, where Dipp refers to 2,6-di-isopropylaniline.

In embodiments, a calcium salt, having substituted disilazide anions, for example a methyl substituted disilazide anion, such as a hexamethyldisilazide anion (also known as bis(trimethylsilyl)amide) or a derivative thereof, enables high current densities and high coulombic efficiency for calcium metal deposition and dissolution. These properties facilitate the use of this salt in batteries based on calcium metal. In addition, the salt is significant for batteries based on metal anodes, which have higher specific energies than batteries based on intercalation anodes, such as $LiC_6$, the anode used in most rechargeable Li batteries today.

It is noted that, in embodiments, the calcium salt is preferably highly soluble (such as >1 M) in the solvent, or solvent system used, thereby enabling very high concentrations of the $Ca^{2+}$-containing solution species that are reduced at the battery's anode during charging. In embodiments, the high concentration of the $Ca^{2+}$-containing solution enables high current densities to be used. In embodiments, high solubility of the calcium salt enables the production of very high local concentrations of soluble $Ca^{2+}$-containing species during battery discharge. On the other hand, low solubility (such as <10 mM) generally limits the current densities that can be used during charging and discharging.

In embodiments, the calcium salt, having substituted disilazide anions, for example a methyl substituted disilazide anion, such as a hexamethyldisilazide anion (also known as bis(trimethylsilyl)amide) or a derivative thereof enables even high concentrations of $Ca^{2+}$ to be dissolved in various solvents suitable for calcium battery cycling. In embodiments, the calcium salt dissociates, in solution with at least one solvent, into $Ca^{2+}$ and $HMDS^-$ ions or derivatives thereof such that the total concentration of $Ca^{2+}$ in all its speciated forms is greater than or equal to 1.0 M. In embodiments, the calcium salt is dissolved in the solvent at a concentration greater than a mole fraction of 0.065. In embodiments, this high concentration has two beneficial effects: first, it enables very high current densities for calcium metal deposition and dissolution (e.g., >30 $mA/cm^2$ at 25 mV/s) in an electrolyte comprised of calcium salt, having substituted disilazide anions, for example a methyl substituted disilazide anion, such as a hexamethyldisilazide anion (also known as bis(trimethylsilyl)amide) or a derivative thereof and any of a variety of solvents, including but not limited to tetrahydrofuran (THF). Second, at sufficiently high concentrations of the calcium salt, having substituted disilazide anions in THF, there is seen an unexpected increase in the coulombic efficiency for the calcium metal deposition/dissolution cycle. This increase may be attributed to the complexation of the solvent in the coordination sphere of the $Ca^{2+}$ ion, such that there is only a very small concentration of "free" (i.e. uncoordinated) THF. Thus, it disclosed herein that this complexation prevents deleterious reactions of THF with the calcium metal anode, thereby enabling high coulombic efficiency. In this embodiment, the amount of free THF in the electrolyte is reduced, because much of it is coordinated in the $Ca^{2+}$ coordination sphere. The $Ca^{2+}$-THF complex is more stable toward calcium metal than free THF. In embodiments, a fraction of THF in the electrolyte that is coordinated in a coordination sphere of the $Ca^{2+}$ is sufficiently high to prevent deleterious reactions with a calcium metal anode. In embodiments, the concentration of free THF is one of: 10 mole %, such as below 10 mole %, including below 9 mole %, below 8 mole %, below 7 mole %, below 6 mole %, below 5 mole %, below 4 mole %, below 3 mole %, below 2 mole %, below 1 mole %, below 0.1 mole %, below 0.01 mole %, for example, between 10 mole % and 0.01 mole %, or between 1 mole % and 0.01 mole %, between 1 mole % and 0.1 mole %, between 0.1 mole % and 0.01 mole %, such as 9 mole %, 8 mole %, 7 mole %, 6 mole %, 5 mole %, 4 mole %, 3 mole %, 2 mole %, 1 mole %, 0.5 mole %, 0.1 mole %, 0.05 mole % or 0.01 mole % of a total amount of solvent in the electrolyte. In embodiments, the solvent is THF and the concentration of calcium salt in the THF is between 1 M and 2.47 M.

It is noted that the calcium salt, having substituted disilazide anions, is not available commercially, and must be synthesized. Thus, heretofore it has not yet been explored as a salt for use in calcium-based batteries. In fact, the only salt that has been successfully studied for reversible calcium metal deposition/dissolution is $Ca(BH_4)_2$. While previous studies using this salt reported concentrations up to 1.5 M, yielding current densities<15 $mA/cm^2$ at 25 mV/s, in stark contrast, the inventors' preliminary work with $Ca(HMDS)_2$ salt has yielded current densities that are better than this figure by more than a factor of two. Further, borohydride salts, such as $Ca(BH_4)_2$, are not suited for use in batteries, due to possible instability and release of hydrogen gas ($H_2$) during unwanted decomposition. Thus, substituted disilazide anions, such as HMDS, represent the only salts now known that provide high concentrations of $Ca^{2+}$, thereby enabling current densities sufficiently high to enable reasonable battery performance.

As a result, there are no known suitable salts that can serve as alternatives to achieve high solubility of $Ca^{2+}$ in solvents suitable for rechargeable calcium batteries. An important feature for battery use is how high a coulombic efficiency for calcium metal deposition/dissolution using calcium salt, having substituted disilazide anions may be obtained. At present, values as high as 80% have been observed, and going forward, it is expected that substantially higher values may be achieved by focusing on salt and solvent purity. Further, increased coulombic efficiency may be realized by exploring the electrochemical behavior of calcium salts having substituted disilazide anions, for example, a methyl-substituted disilazide anion such as hexamethyldisilazide (also known as bis(trimethylsilyl)amide), or a derivative thereof in other solvents, such as, for example, amine solvents, such as dimethylethylamine.

In embodiments, a calcium based rechargeable battery includes a Ca(HMDS)$_2$ salt and at least one solvent, suitable for calcium battery cycling. In embodiments, the at least one solvent includes THF. Alternatively, for example, the at least one solvent may include one or more of: diethyl ether, diisopropylether, methyl t-butyl ether (MTBE), 1,3-dioxane, 1,4-dioxane, tetrahydropyran, glyme, diglyme, triglyme, tetraglyme or an amine based solvent, such as N,N-dimethylethylamine (DMEA), triethylamine (TEA), and tetramethylethylenediamine (TMEDA). In embodiments, a calcium based rechargeable battery does not include Ca(BH$_4$)$_2$.

In embodiments, the calcium salt, having substituted disilazide anions, for example a methyl substituted disilazide anion, such as a hexamethyldisilazide anion (also known as bis(trimethylsilyl)amide) or a derivative thereof dissociates in solution with the solvent into Ca$^{2+}$ and HMDS$^-$ ions, the concentration of Ca$^{2+}$ being greater than or equal to 3.0 M.

In embodiments, batteries made using the calcium salt, having substituted disilazide anions, for example a methyl substituted disilazide anion, such as a hexamethyldisilazide anion (also known as bis(trimethylsilyl)amide) or a derivative thereof may include either a liquid electrolyte comprised of this salt dissolved in any of the solvents listed above, or, for example, a polymer gel electrolyte comprised of this salt in a dissolved state in any of the solvents listed above, and mixed with a suitable polymer matrix (e.g., a polymer gel electrolyte). The cathode of the battery may use a redox active material capable of Ca$^{2+}$ insertion, such as, for example, V$_2$O$_5$, Mn$_2$O$_4$, MnO$_2$, or any of a number of cathode materials previously used for Na$^+$ insertion. In embodiments, this class of materials would be suitable based on the similar ionic sizes of Na$^+$ and Ca$^{2+}$. Examples of such materials include NaMnFe$_2$(PO$_4$)$_3$, NaVO$_3$, Na$_2$FeP$_2$O$_7$, or the like.

FIGS. 1-7 described how at high concentrations of Ca(HMDS)$_2$, the electrolyte has characteristics of a "solvate" ionic liquid (IL). It is here noted that an ionic liquid is simply a low melting salt. The typical definition is that it is in its liquid state at temperatures below 100 degrees C. In contrast, a solvate ionic liquid is one in which essentially all of the solvent is engaged in direct, inner sphere bonding with the metal ion. Under such circumstances, the free solvent content is vanishingly small, such as less than 10 mole %. Thus, in embodiments, an electrolyte system may be provided that includes calcium salt, having substituted disilazide anions, for example a methyl substituted disilazide anion, such as a hexamethyldisilazide anion (also known as bis(trimethylsilyl)amide) or a derivative thereof dissolved in various solvents as noted above, under conditions where the result is a solvate ionic liquid. These include, for example, compositions in which the calcium salt, having substituted disilazide anions, for example a methyl substituted disilazide anion, such as a hexamethyldisilazide anion (also known as bis(trimethylsilyl)amide) or a derivative thereof has a mole fraction higher than 0.14. As described in the Example below, this value is based upon a sigmoidal fit of the FTIR spectroscopic data, which shows a limiting value achieved somewhere between 0.14 and 0.16 mole fraction of Ca(HMDS)$_2$. It is contemplated that methods in addition to spectroscopic tools may be used to define where the solvate composition occurs.

The following example is provided to illustrate particular features of certain embodiments. However, the particular features described below should not be construed as limitations on the scope of the disclosure, but rather as examples from which equivalents will be recognized by those of ordinary skill in the art.

EXAMPLES

Example 1

The inventors synthesized a Ca(HMDS)$_2$ salt using known techniques. While this salt has been described in the general area of synthesis of calcium compounds, there is no reference to its use in electrochemical settings. It is further noted that the results below reflect the behavior of relatively impure materials that may have some amount of deleteriously reactive impurities, as the salt used by the inventors was not totally pure. The results of these studies are shown in FIGS. 1-7.

Figure 2:
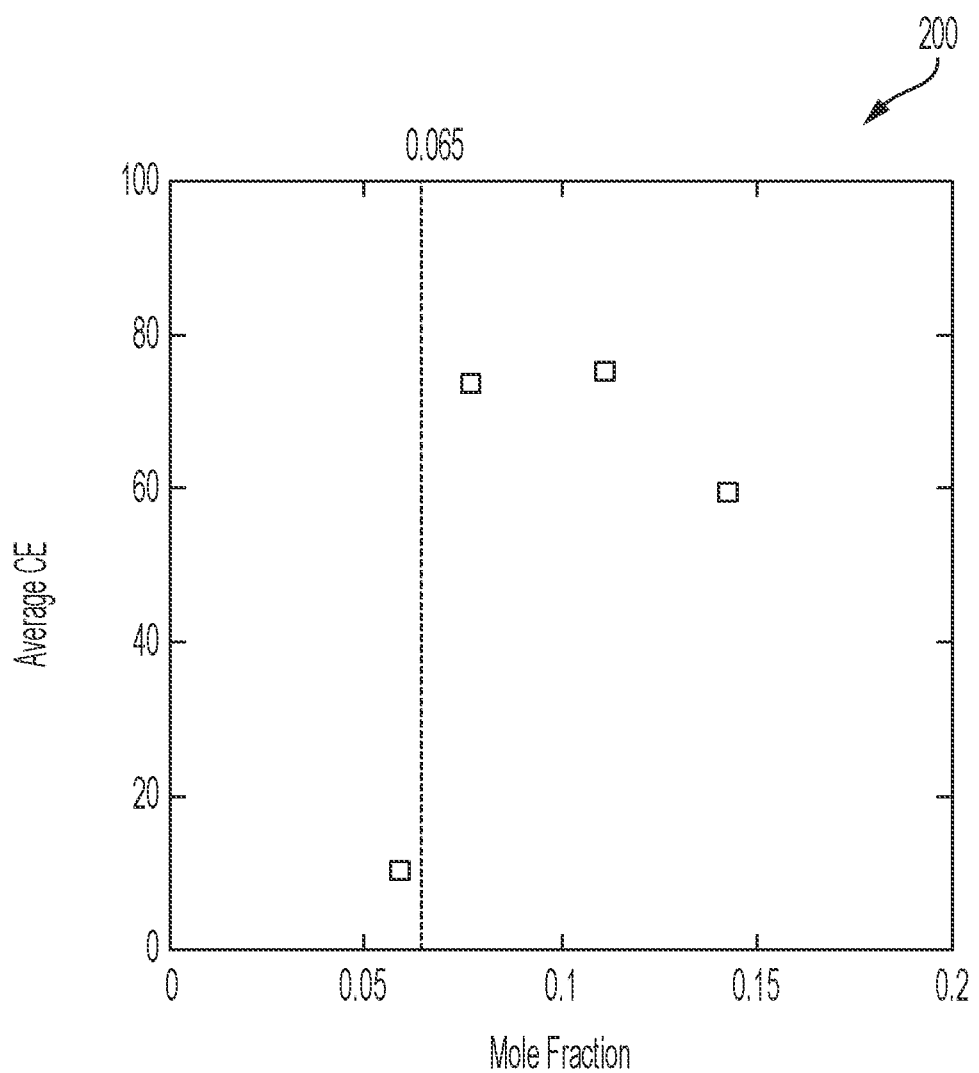
FIG. 2 is a plot of average Coulombic efficiency versus mole fraction for Ca(HMDS)$_2$ dissolved in THF, in accordance with various embodiments. Transition at mole fraction=0.06-0.07. Low coulombic efficiency at low Ca(HMDS)$_2$ mole fraction was observed. Plot shows a transition in coulombic efficiency, with markedly higher values at higher [Ca(HMDS)$_2$]. It is believed that at very high mole fractions of Ca(HMDS)$_2$, essentially all THF is coordinated by Ca$^{2+}$ (i.e. "free" [THF] is approximately zero). Infrared spectroscopy was used to examine any changes in the electrolyte over this concentration range.

The inventors have shown that the Ca(HMDS)$_2$ salt may be dissolved in THF up to concentrations of at least 2.47 M. FIG. 1 shows single cycle and multiple cycle data for Ca(HMDS)$_2$ dissolved in THF at a concentration of 1 M. As can be seen in FIG. 1, on a negative-going scan, metal deposition begins near −0.8 V versus a calcium reference electrode. On the return scan, metal stripping (metal oxidative dissolution) initiates near −0.7 V, and the metal stripping charge shows good behavior. The ratio of the metal stripping charge to the charge for metal deposition gives the Coulombic efficiency (CE). In various implementations, the inventors have achieved CE values near 80%. Interestingly, it is noted that very low CE values were seen at low concentrations of Ca(HMDS)$_2$ in THF, i.e. near 0.75 M. However, much higher values were seen for concentrations of 1 M and above. This is shown in FIG. 2, which presents a plot of CE versus mole fraction of Ca(HMDS)$_2$ in the electrolyte. As shown, a remarkable increase in CE near a mole fraction of 0.065 occurs.

Figure 3:
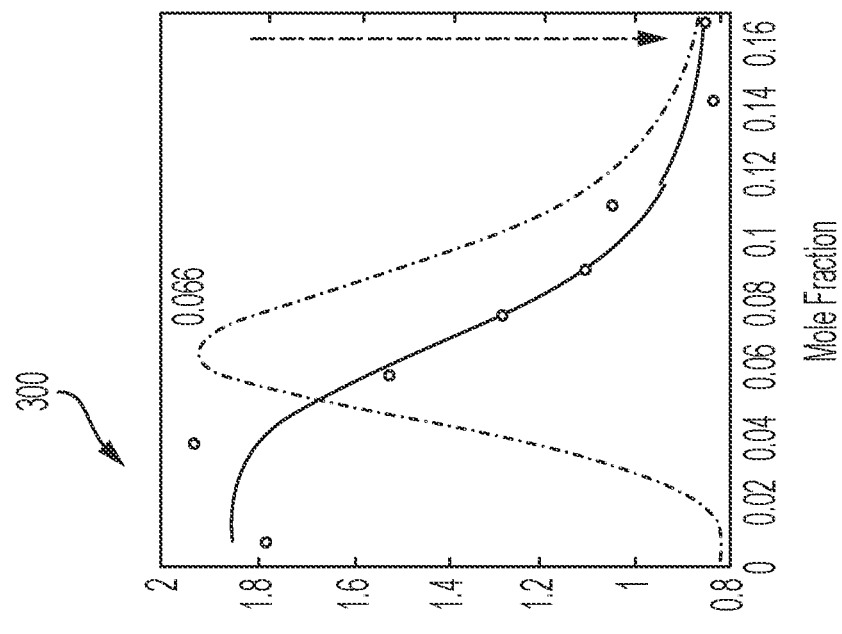
FIG. 3 illustrates FTIR of THF at increasing Ca(HMDS)$_2$ mole fraction. In particular, FTIR results show the 910 cm$^{-1}$ region of THF that allows differentiation of free and coordinated THF. As demonstrated, THF ring mode shows decreasing "free" THF (910 cm$^{-1}$) and increasing coordinated THF (875 cm$^{-1}$) as mole fraction of Ca(HMDS)$_2$ increases. Sigmoidal fit also showed inflection point at mole fraction of 0.066, consistent with the CE results. Saturation at mole fraction 0.16 is consistent with a "solvate" IL, [Ca(HMDS)(THF)$_6$][HMDS].
Figure 3:
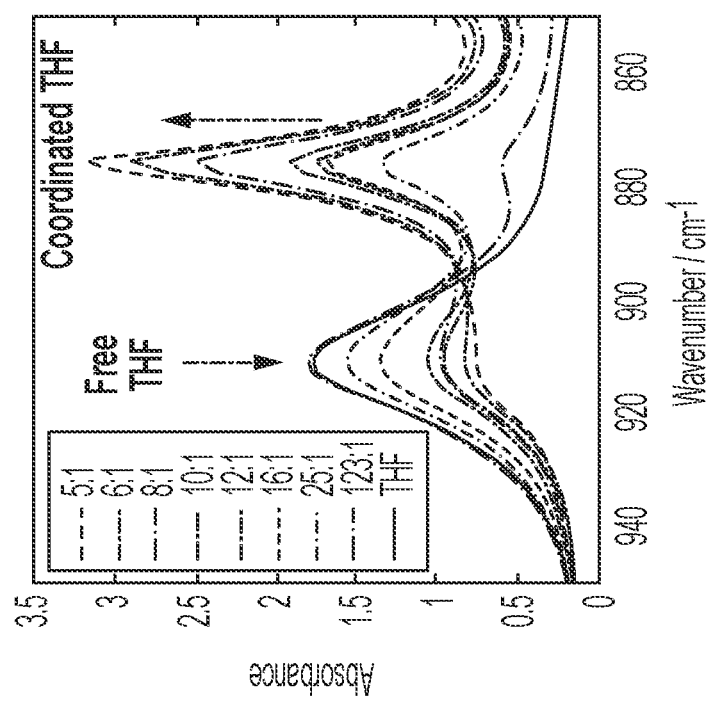
Figure 4:
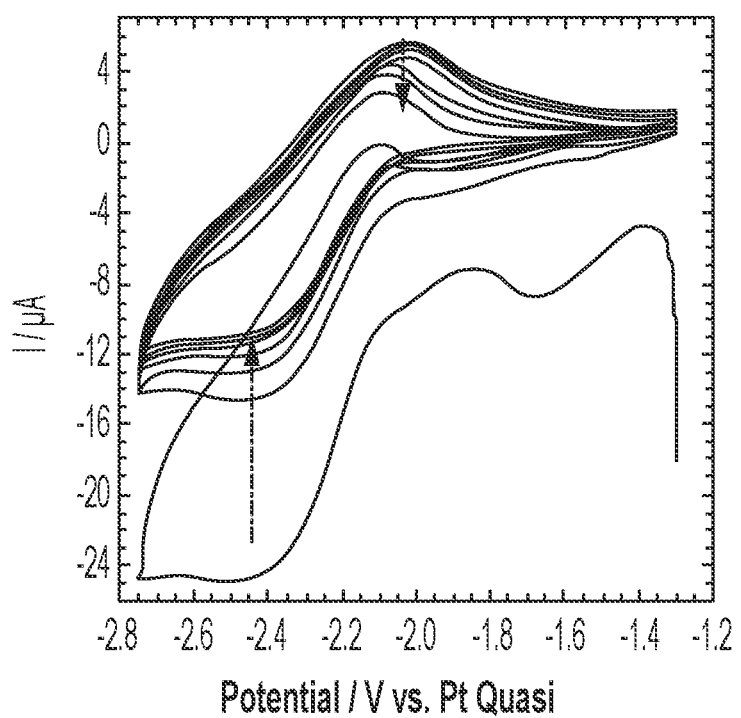
FIG. 4 illustrates 17 mM Ca(TFSI)$_2$ in BMP TFSI ionic liquid wherein coulombic efficiency starts at less than 50% and current density degrades with cycling and Ca$^{2+}$/Ca showed only limited reversibility in BMP TFSI (Pt(w), Pt(c), Pt(ref), 50 mV/s).
Figure 5:
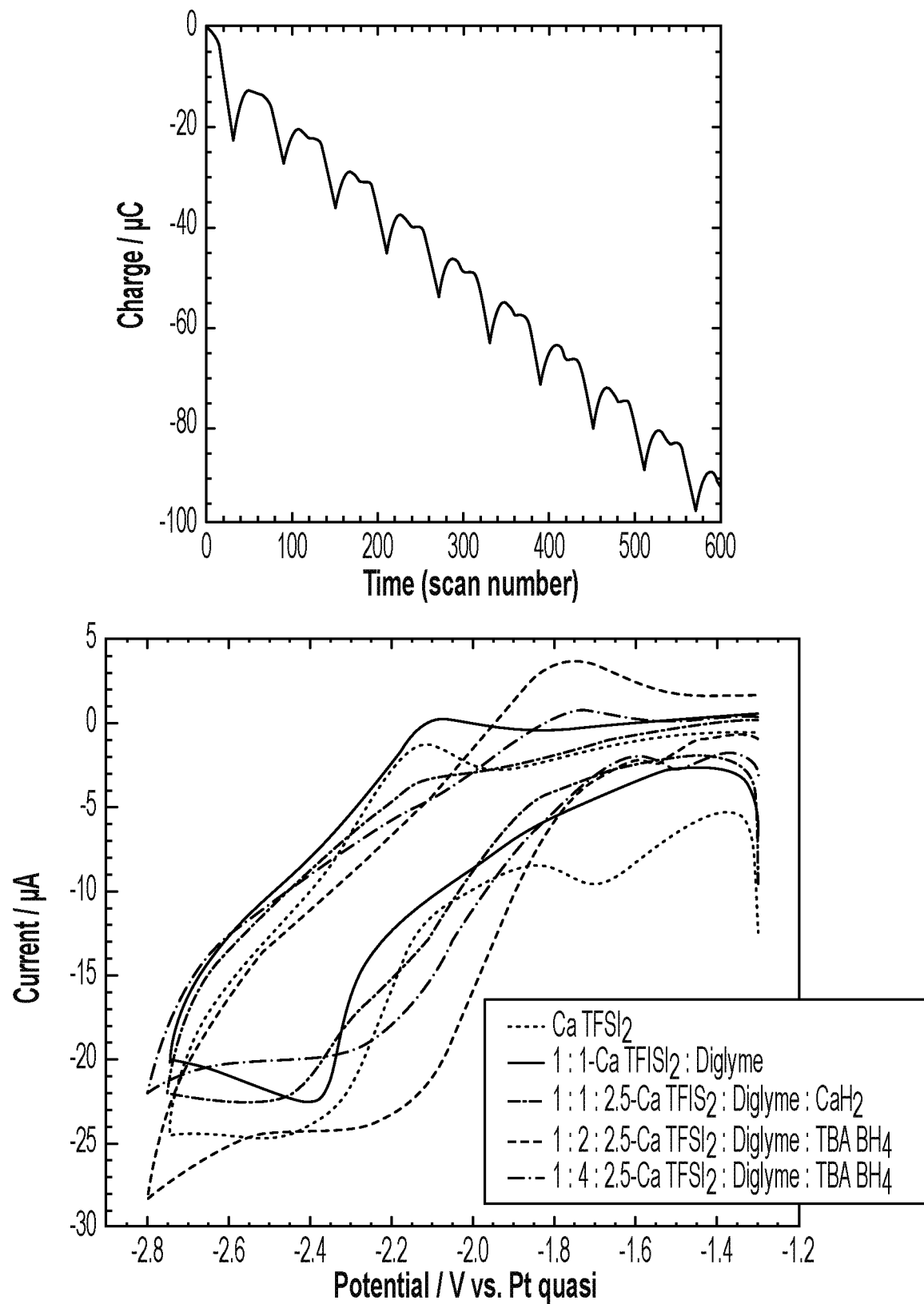
FIG. 5 illustrates Ca$^{2+}$/Ca in BMP TFSI ionic liquid+ diglyme and BH$_4$. As illustrated, diglyme and free BH$_4$ did not have much effect. Best result for coulombic efficiency was Ca 65% per cycle. Studies illustrated that strategies that were effective for Mg$^{2+}$/Mg are not effective for Ca$^{2+}$/Ca.
Figure 6:
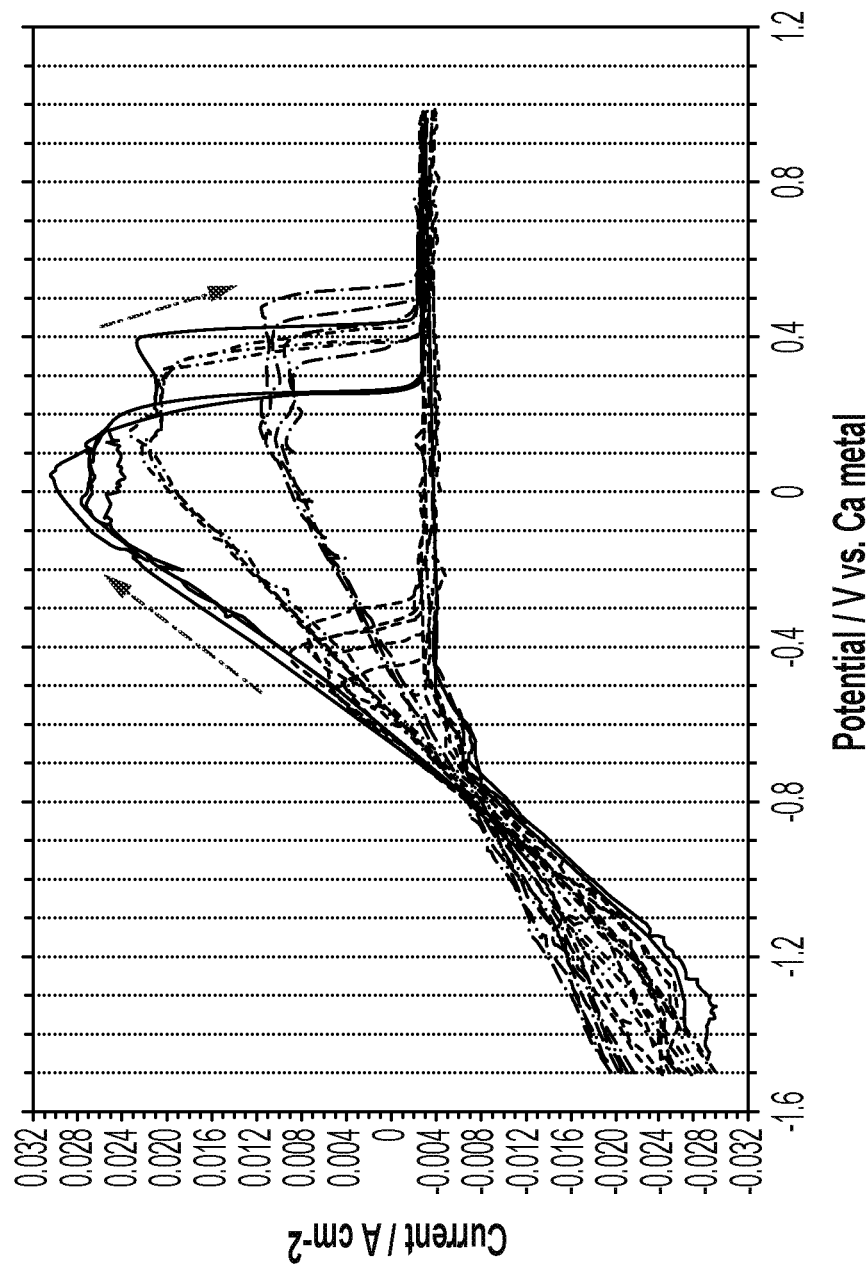
FIG. 6 illustrates cycling as a function of [Ca(HMDS)$_2$]/THF. Very high solubility was observed, enabling high current densities (>30 mA cm$^{-2}$) and studies over a wide range of concentrations. As concentration increased, current density was observed to increase and then decrease. Concentrated solutions are extremely viscous and higher viscosity can be a signature of a "solvate" ionic liquid.
Figure 7:
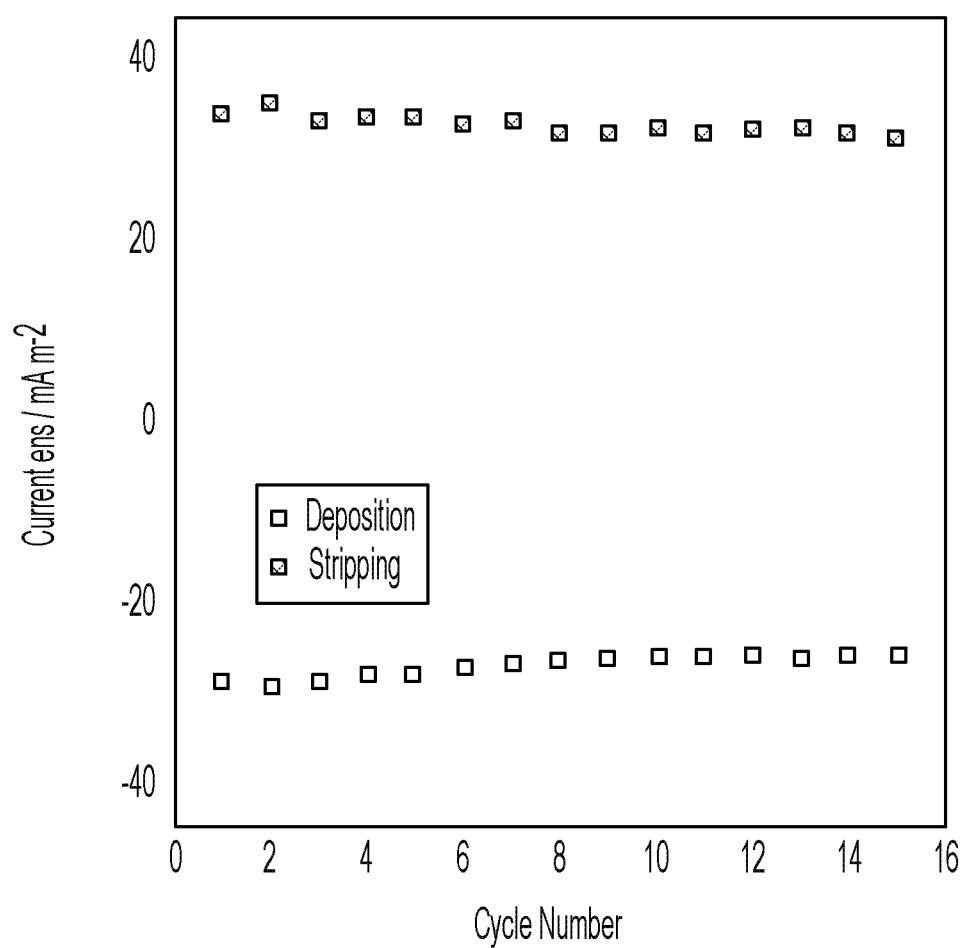
FIG. 7 illustrates cycling current densities for Ca$^{2+}$/Ca in Ca(HMDS)$_2$/THF. Cycling demonstrates high current densities over multiple cycles. 30 mA cm$^{-2}$ is greater than 2× higher than any previously reported for Ca and much higher (>10×) than Mg. This electrolyte has characteristics of a "solvate" ionic liquid or a "solvent-in-salt". Ca/Ca$^{2+}$ shows superior cycling behavior in the solvate ionic liquid compared to lower concentrations.

Additionally, infrared spectroscopy was used to examine the THF stretching vibrations in an attempt to understand the remarkable and unexpected increase in CE with concentration/mole fraction, described above. In this analysis, the difference in vibrational frequencies for THF that is free in the electrolyte and THF that is coordinated with its oxygen atom to the Ca$^{2+}$ ions in the electrolyte was taken advantage of. As shown in FIG. 3, the fraction of free THF decreases substantially as the Ca(HMDS)$_2$ mole fraction is increased. This change occurs over the same range of mole fraction as does the increase in CE. Thus, the increased CE is attributed to the reduced availability of THF for deleterious reactions with the calcium metal surface. These deleterious reactions may otherwise lead to calcium metal consumption and poor reversibility for the metal deposition and dissolution processes.

It is important to note that the high concentrations to which the Ca(HMDS)$_2$ salt can be dissolved in THF, or other solvents, enables this behavior.

Thus, a significant increase in the CE of calcium metal deposition and dissolution occurs at very high concentrations (or, it may be said, at very high mole fractions) of Ca(HMDS)$_2$ salt in THF. It is believed this trend represents a general trend and thus is expected to be seen in other solvents into which Ca(HMDS)$_2$ can be dissolved. Thus, Ca(HMDS)$_2$ salt may be beneficially used in calcium batteries.

In summary, speciation of metal ions in ionic liquids is key in directing the behavior of their redox processes. TFSI$^-$ is clearly a bad actor under reducing conditions (especially with reactive radicals) and should likely be avoided for such applications. Further, $BH_4^-$ scavenges water, but is much more effective when not coordinated. $HMDS^-$ includes a new anion type for multivalent systems that can control water and enhance metal ion solubility, giving access to concentration ranges where solvate ILs can be formed. $HMDS^-$ enables extremely high $Ca^{2+}$ solubility in a range of solvents, allowing for quite good redox behavior for $Ca/Ca^{2+}$.

Example 2

New Electrolytes for Calcium Battery Systems Based on Amine Solvents

Based on the successful use of PEO compounds to keep the reactive odd-electron species $Mg^+$ away from possible reaction partners, the inventors explored new complexation systems based on amines. The objective was to suppress reaction of $Ca^+$ with oxygen-containing compounds by providing N-donor ligands. The inventors examined amine compounds both as additives and as neat solvents. The compounds examined included N,N-dimethylethylamine (DMEA), Triethylamine (TEA), and Tetramethylethylenediamine (TMEDA).

Figure 8:
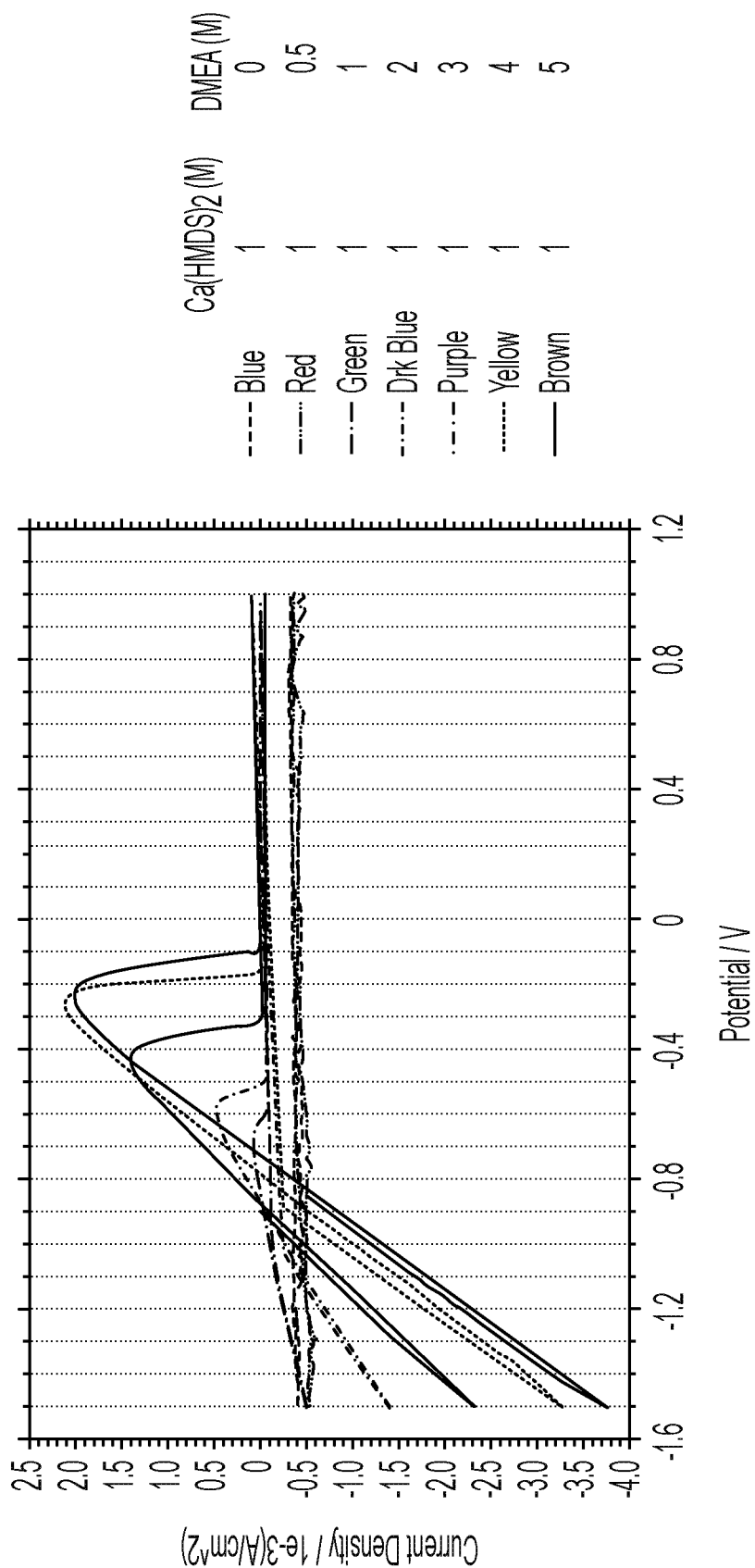
FIG. 8 is a graph illustrating the effect of amine concentration on reversible deposition.

FIG. 8 shows the effect of amine additives: $Ca(HMDS)_2$/Toluene/DMEA. $Ca(HMDS)_2$ dissolves at high concentration in toluene, but no electrochemistry (suggests fully ion-paired). The stoichiometric addition of DMEA turns on the electrochemistry, giving reasonably reversible deposition. The effect saturates at 4 mol DMEA/1 mol $Ca^{2+}$. This is consistent with speciation as $[Ca(HMDS)(DMEA)_4]^+$.

Figure 9:
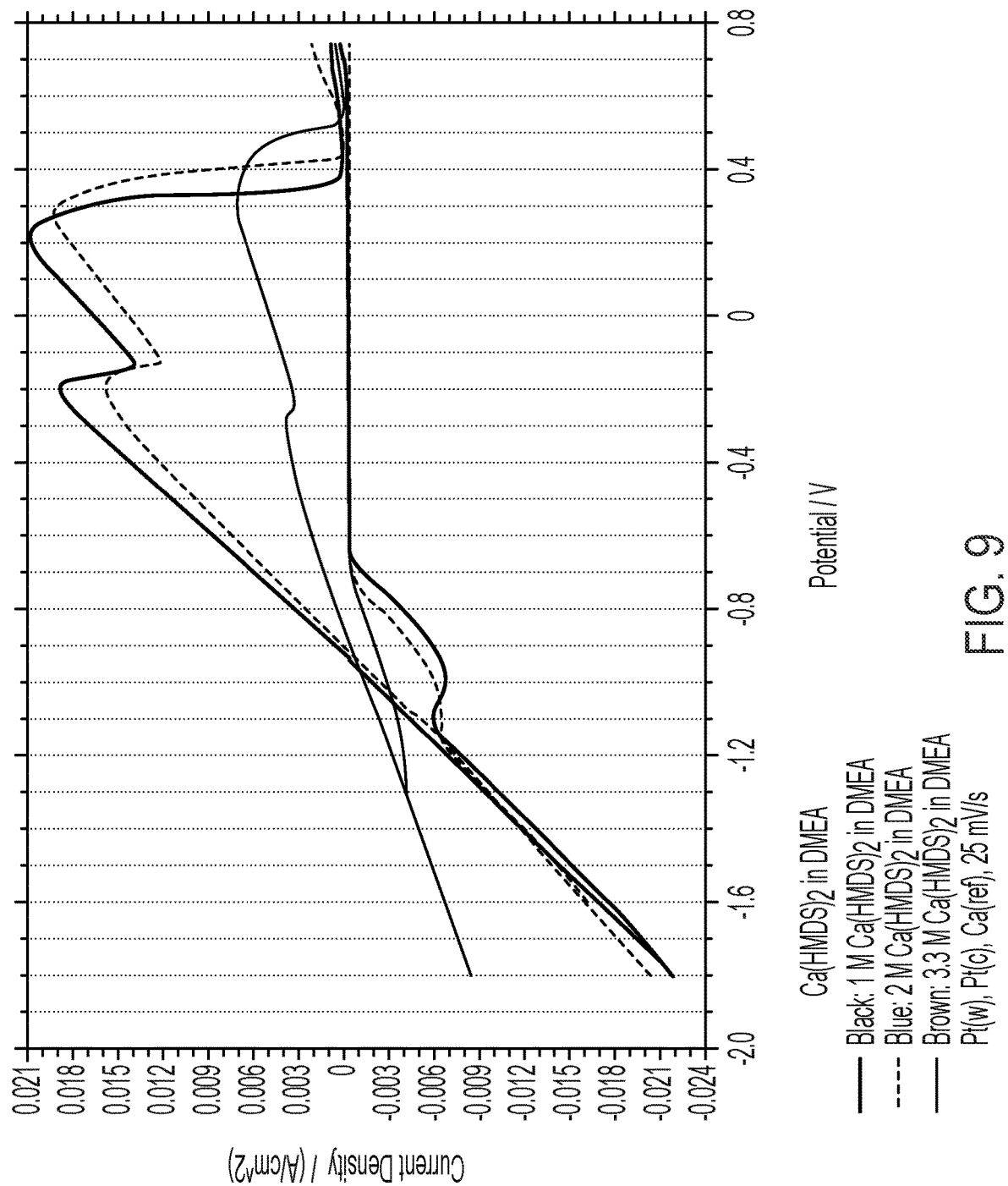
FIG. 9 is a graph illustrating the effect of Ca(HMDS)$_2$ concentration on reversible deposition.

FIG. 9 shows a new electrolyte: $Ca(HMDDS)_2$/dimethylethylamine (DMEA)/$Ca(HMDS)_2$ also dissolves at high concentrations in neat DMEA. Using this system chemically reversible reductive deposition can be seen. Solutions with high $[Ca(HMDS)_2]$ are very viscous, like the $Ca(HMDS)_2$/THF system. This electrolyte gives reasonable reversibility for Ca anode electrochemistry.

Figure 10:
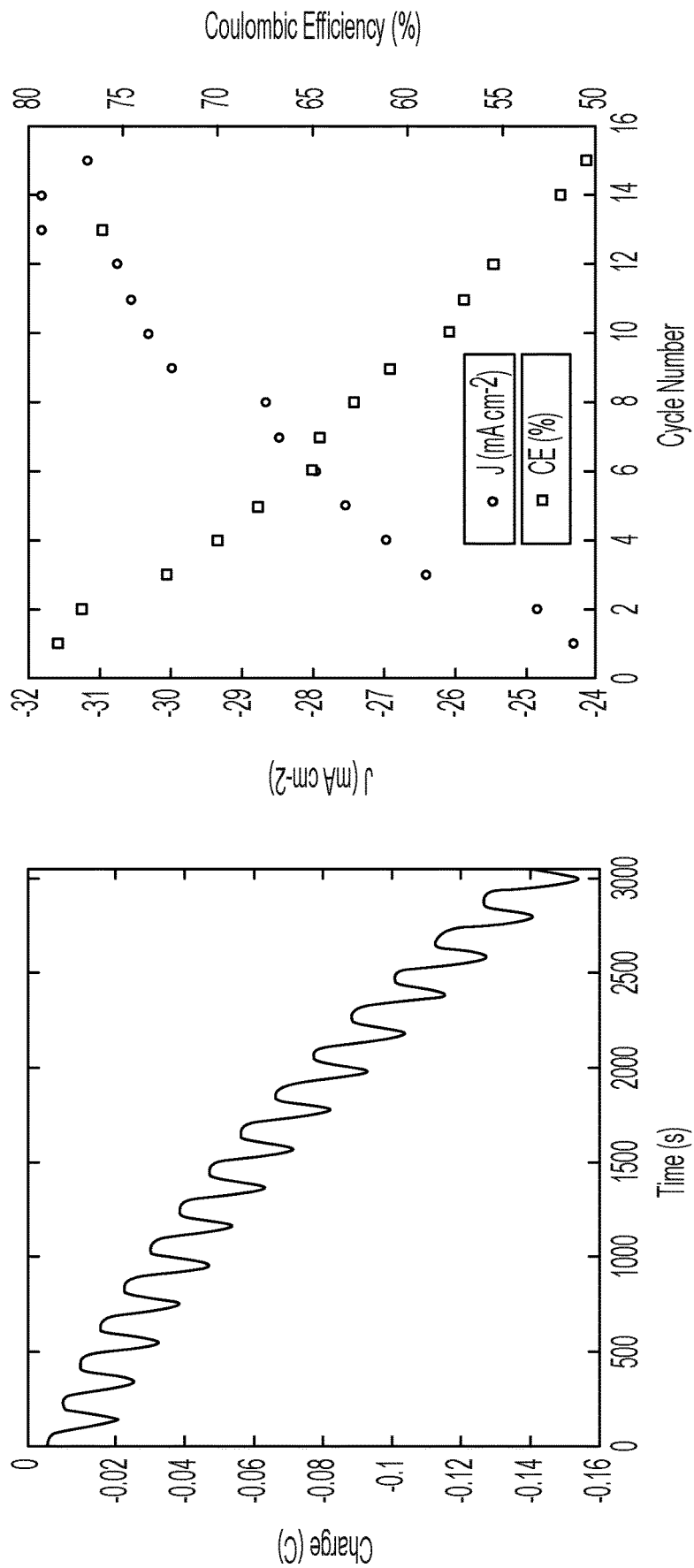
FIG. 10 illustrates the effect of cyclic charging and discharging.

FIG. 10 shows $Ca(HMDS)_2$/dimethylethylamine (DMEA)+TEA. $Ca(HMDS)_2$ dissolves at high concentrations in DMEA/TEA mixtures. Best reversibility so far is with 50 mol % TEA (based on Ca).

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method of providing a battery, comprising:
   providing an anode;
   providing a cathode;
   providing a calcium salt, comprising a $Ca^{2+}$ cation and two hydrocarbon substituted disilazide anions; and
   dissolving the calcium salt in at least one solvent, the at least one solvent suitable for calcium battery cycling.

2. The method of claim 1, wherein the hydrocarbon substituted disilazide anions comprise a hexamethyldisilazide anion or a derivative thereof.

3. The method of claim 2, wherein the hydrocarbon substituted disilazide anions comprises $^-N(SiMe_3)(SiMe_2{}^tBu)$, where $^tBu$ refers to a tertiary butyl group, $^-N(SiMe_3)(SiPh_2{}^tBu)$, where Ph refers to a phenyl group, $^-N(SiMePh_2)_2$, $^-N(SiMe_3)(SiPh_3)$, or $^-N(SiMe_3)(Mes)$, where Mes refers to a mesityl group, or $N(SiMe_3)(Dipp)$, where Dipp refers to 2,6-di-isopropylaniline.

4. The method of claim 1, wherein the at least one solvent includes: diethyl ether, diisopropyl ether, methyl t-butyl ether (MTBE), 1,3-dioxane, 1,4-dioxane, tetrahydrofuran (THF), tetrahydropyran, glyme, diglyme, triglyme, a tetraglyme, a tertiary amine, or any mixture thereof.

5. The method of claim 1, wherein the calcium salt dissociates, in solution with the at least one solvent, into $Ca^{2+}$ and $HMDS^-$ ions or derivatives thereof such that a concentration of $Ca^{2+}$ is greater than or equal to 1.0 M.

6. The method of claim 5, wherein the concentration of $Ca^{2+}$ enable current densities for calcium metal deposition and dissolution >30 $mA/cm^2$ at 25 mV/s.

7. The method of claim 4, wherein a fraction of THF in an electrolyte that is coordinated in a coordination sphere of the $Ca^{2+}$ is sufficiently high to prevent deleterious reactions with a calcium metal anode.

8. The method of claim 7, wherein a concentration of free THF is one of:
   below 10 mole % of a total amount of solvent in the electrolyte;
   below 1 mole % of a total amount of solvent in the electrolyte;
   below 0.1 mole % of a total amount of solvent in the electrolyte; or
   below 0.01 mole % of a total amount of solvent in the electrolyte.

9. The method of claim 1, wherein the at least one solvent is tetrahydrofuran (THF) and a concentration of calcium salt in the THF is between 1 M and 2.47 M.

10. The method of claim 1, wherein the calcium salt is dissolved in the solvent at a concentration greater than a mole fraction of 0.065.

11. The method of claim 1, wherein the calcium salt is provided as a liquid electrolyte, which is dissolved in the at least one solvent.

12. The method of claim 1, wherein the calcium salt is dissolved in a polymer gel electrolyte in the at least one solvent, and mixed with a suitable polymer matrix.

13. The method of claim 1, wherein the cathode further comprises a redox active material capable of $Ca^{2+}$ insertion, such as at least one of: $V_2O_5$, $Mn_2O_4$, or $MnO_2$.

14. The method of claim 12, wherein the cathode further comprises a material used for $Na^+$ insertion, such as at least one of $NaMnFe_2(PO_4)_3$, $NaVO_3$, or $Na_2FeP_2O_7$.

* * * * *